United States Patent
Sundar Pal et al.

(10) Patent No.: US 10,841,772 B2
(45) Date of Patent: Nov. 17, 2020

(54) METHOD AND SYSTEM FOR CONTROLLING COMMUNICATION BETWEEN INTERNET-OF-THINGS (IOT) DEVICES

(71) Applicant: Wipro Limited, Bangalore (IN)

(72) Inventors: Shyam Sundar Pal, Kolkata (IN); Gopinath Das, Balasore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/278,798

(22) Filed: Feb. 19, 2019

(65) Prior Publication Data

US 2020/0213829 A1 Jul. 2, 2020

(30) Foreign Application Priority Data

Dec. 28, 2018 (IN) .............................. 201841049662

(51) Int. Cl.
| | |
|---|---|
| *H04W 4/80* | (2018.01) |
| *H04W 4/70* | (2018.01) |
| *H04W 76/18* | (2018.01) |
| *H04W 8/00* | (2009.01) |
| *H04W 56/00* | (2009.01) |
| *H04W 80/10* | (2009.01) |

(52) U.S. Cl.
CPC .............. *H04W 4/80* (2018.02); *H04W 4/70* (2018.02); *H04W 8/005* (2013.01); *H04W 56/001* (2013.01); *H04W 76/18* (2018.02); *H04W 80/10* (2013.01)

(58) Field of Classification Search
CPC ................................. H04W 4/80; H04W 4/70
See application file for complete search history.

(56) References Cited

U.S. PATENT DOCUMENTS

| | | | |
|---|---|---|---|
| 10,327,123 B1* | 6/2019 | Gitlin ................ | H04W 52/0219 |
| 10,609,611 B2* | 3/2020 | Park .................. | H04W 36/0094 |
| 2011/0161478 A1* | 6/2011 | Formo ................. | H04L 63/105 |
| | | | 709/223 |
| 2013/0054863 A1* | 2/2013 | Imes ................... | H04L 12/2827 |
| | | | 710/304 |

(Continued)

*Primary Examiner* — Parth Patel
(74) *Attorney, Agent, or Firm* — Finnegan, Henderson, Farabow, Garrett & Dunner, LLP

(57) ABSTRACT

The method of reliable Internet-Of-Thing (IOT) communication across a plurality of IOT devices, involves identifying device information of a source-IOT-device upon synchronization of the source-IOT-device with a current NB-IOT eNB in an IOT network. Upon activating a first IOT application of the source-IOT-device, a check is made to determine that a first target-IOT-device is discoverable in the current NB-IOT eNB for establishing a first IOT session from the source-IOT-device to the target-IOT-device. A short-distance communication link or a NB-IOT communication link may be selected based on the device information of the source-IOT-device, the discoverability of the first target-IOT-device, and the first IOT application activated on the source-IOT-device, A Physical Resource Block (PRB) for a plurality of packets transmitted using the first communication link may be dynamically allocated based on a buffer occupancy associated with the first IOT application of the source-IOT-device.

13 Claims, 6 Drawing Sheets

(56) References Cited

U.S. PATENT DOCUMENTS

| | | | |
|---|---|---|---|
| 2013/0138796 A1* | 5/2013 | Nicholson | H04L 67/16 709/224 |
| 2013/0188515 A1* | 7/2013 | Pinheiro | H04L 67/16 370/254 |
| 2014/0173076 A1* | 6/2014 | Ravindran | H04L 41/5058 709/223 |
| 2014/0244568 A1* | 8/2014 | Goel | H04W 4/08 706/52 |
| 2014/0244834 A1* | 8/2014 | Guedalia | H04L 67/16 709/224 |
| 2014/0269660 A1* | 9/2014 | Dunn | H04L 12/283 370/338 |
| 2015/0142968 A1* | 5/2015 | Bhagwat | H04L 67/16 709/224 |
| 2015/0156266 A1* | 6/2015 | Gupta | H04W 4/70 709/224 |
| 2015/0163289 A1* | 6/2015 | Paul | G06F 9/5066 709/201 |
| 2015/0169768 A1* | 6/2015 | Xu | G06F 16/951 707/770 |
| 2015/0170212 A1* | 6/2015 | McGie | G06Q 30/0267 705/14.64 |
| 2015/0295634 A1* | 10/2015 | Zhang | H04W 8/005 370/315 |
| 2016/0007137 A1* | 1/2016 | Ahn | H04W 4/70 370/254 |
| 2016/0085594 A1* | 3/2016 | Wang | G06F 9/45558 709/226 |
| 2016/0095099 A1* | 3/2016 | Yang | H04W 8/005 370/330 |
| 2016/0135241 A1* | 5/2016 | Gujral | H04W 4/70 370/328 |
| 2016/0353326 A1* | 12/2016 | Novo Diaz | H04W 28/085 |
| 2017/0027008 A1* | 1/2017 | Krishnamoorthy | H04L 67/1072 |
| 2017/0034834 A1* | 2/2017 | Folke | H04W 76/14 |
| 2017/0134927 A1* | 5/2017 | Lee | H04W 24/02 |
| 2017/0195260 A1* | 7/2017 | Ma | H04L 49/552 |
| 2017/0276764 A1* | 9/2017 | Vilermo | G01S 3/02 |
| 2017/0290001 A1* | 10/2017 | Axmon | H04W 56/0045 |
| 2017/0353981 A1* | 12/2017 | Lee | H04W 12/08 |
| 2018/0048984 A1* | 2/2018 | Park | H04L 1/1887 |
| 2018/0063841 A1* | 3/2018 | Song | H04W 72/0453 |
| 2018/0092125 A1* | 3/2018 | Sun | H04W 74/02 |
| 2018/0206133 A1* | 7/2018 | Venkatraman | H04W 4/70 |
| 2018/0213382 A1* | 7/2018 | Tabet | H04L 67/04 |
| 2018/0324105 A1* | 11/2018 | Gillon | H04L 67/327 |
| 2018/0341533 A1* | 11/2018 | Shanbhag | G06F 3/04883 |
| 2019/0028545 A1* | 1/2019 | Yang | H04L 29/02 |
| 2019/0098697 A1* | 3/2019 | Fujishiro | H04W 36/03 |
| 2019/0121613 A1* | 4/2019 | Chang | G06Q 20/327 |
| 2019/0138318 A1* | 5/2019 | Yang | H04L 41/0853 |
| 2019/0141694 A1* | 5/2019 | Gupta | H04W 36/03 |
| 2019/0150068 A1* | 5/2019 | Montojo | H04L 5/0046 370/329 |
| 2019/0208024 A1* | 7/2019 | Jablonski | G06F 40/284 |
| 2019/0208438 A1* | 7/2019 | Yang | H04W 28/021 |
| 2019/0253280 A1* | 8/2019 | Sano | H04L 67/025 |
| 2019/0253868 A1* | 8/2019 | Zalzalah | H04W 4/70 |
| 2019/0280940 A1* | 9/2019 | Furuichi | H04L 41/12 |
| 2019/0281511 A1* | 9/2019 | Susitaival | H04W 36/0061 |
| 2019/0289082 A1* | 9/2019 | Furuichi | H04W 4/70 |
| 2019/0294796 A1* | 9/2019 | Elango | H04L 63/1425 |
| 2019/0306024 A1* | 10/2019 | Petria | H04L 12/66 |
| 2019/0319861 A1* | 10/2019 | Pan | H04L 41/5006 |
| 2019/0320358 A1* | 10/2019 | Knapp | H04W 52/0212 |
| 2019/0342154 A1* | 11/2019 | Nair | H04L 41/08 |
| 2019/0356502 A1* | 11/2019 | Nair | H04L 12/2814 |
| 2019/0373652 A1* | 12/2019 | Hong | H04W 92/18 |
| 2020/0021941 A1* | 1/2020 | Nguyen | H04B 7/155 |
| 2020/0059915 A1* | 2/2020 | Lee | H04W 56/0015 |
| 2020/0068439 A1* | 2/2020 | Avula | H04L 67/141 |
| 2020/0076896 A1* | 3/2020 | Anumala | H04W 60/04 |
| 2020/0090194 A1* | 3/2020 | Kurian | G01C 21/3492 |
| 2020/0092376 A1* | 3/2020 | Morris | H04L 41/12 |
| 2020/0092685 A1* | 3/2020 | Fehrenbach | H04W 68/005 |
| 2020/0106712 A1* | 4/2020 | Sundaram | H04L 47/76 |
| 2020/0107381 A1* | 4/2020 | Ahmad | H04W 76/14 |

\* cited by examiner

METHOD AND SYSTEM FOR CONTROLLING COMMUNICATION BETWEEN INTERNET-OF-THINGS (IOT) DEVICES

TECHNICAL FIELD

This disclosure relates generally to Internet of Things (IOT) networks, and more particularly to an improved IOT communication in the IOT network.

BACKGROUND

The Internet Of Things (IOT) refers to a network of IOT devices with internet connectivity, that enables communication between the IOT devices and other internet-enabled devices. Such IOT devices are seamlessly connected to the internet to capture, integrate, and process information using servers and computing devices located anywhere across the globe. The connected IOT devices may form their own IOT network, requiring communication within nodes in the IOT network, and to other IOT networks which may be different in nature (based on services, topology, communication protocols, connectivity, and the like) and may be located geographically far apart.

In a heterogeneous environment, IOT devices that are diverse in nature may communicate with each other locally and via internet globally using different communication technologies. Such kind of the IOT devices in the heterogeneous environment may pose several challenges and requirements for choosing the best amongst the available communication technologies. Additionally, as the data traffic exchange between the IOT devices tends to fluctuate over time, the transmission efficiency/overhead of a communication protocol used in the IOT communication may be deteriorated thus increasing the latencies and scalability issues related to diverse nature of the IOT devices in heterogeneous environment.

SUMMARY

In one embodiment, a method of managing communication between Internet-Of-Thing (IOT) devices is disclosed. The method may involve identifying device information of a source-IOT-device upon synchronization of the source-IOT-device with a current NB-IOT eNB in an IOT network. Upon activating a first IOT application of the source-IOT-device, a check is made to determine that a first target-IOT-device is discoverable in the current NB-IOT eNB for establishing a first IOT session from the source-IOT-device to the target-IOT-device. A short-distance communication link or a NB-IOT communication link may be selected based on the device information of the source-IOT-device, the discoverability of the first target-IOT-device, and the first IOT application activated on the source-IOT-device. A Physical Resource Block (PRB) for a plurality of packets transmitted using the first communication link may be dynamically allocated based on a buffer occupancy of uplink and/or downlink data volume associated with the first IOT application.

In one embodiment, a Narrow Band Internet of Things evolved nodeB (NB-IOT eNB) for managing communication between IOT devices is disclosed. In one embodiment, a non-transitory computer-readable medium storing computer-executable instructions in NB-IOT eNB for managing communication between IOT devices is disclosed.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
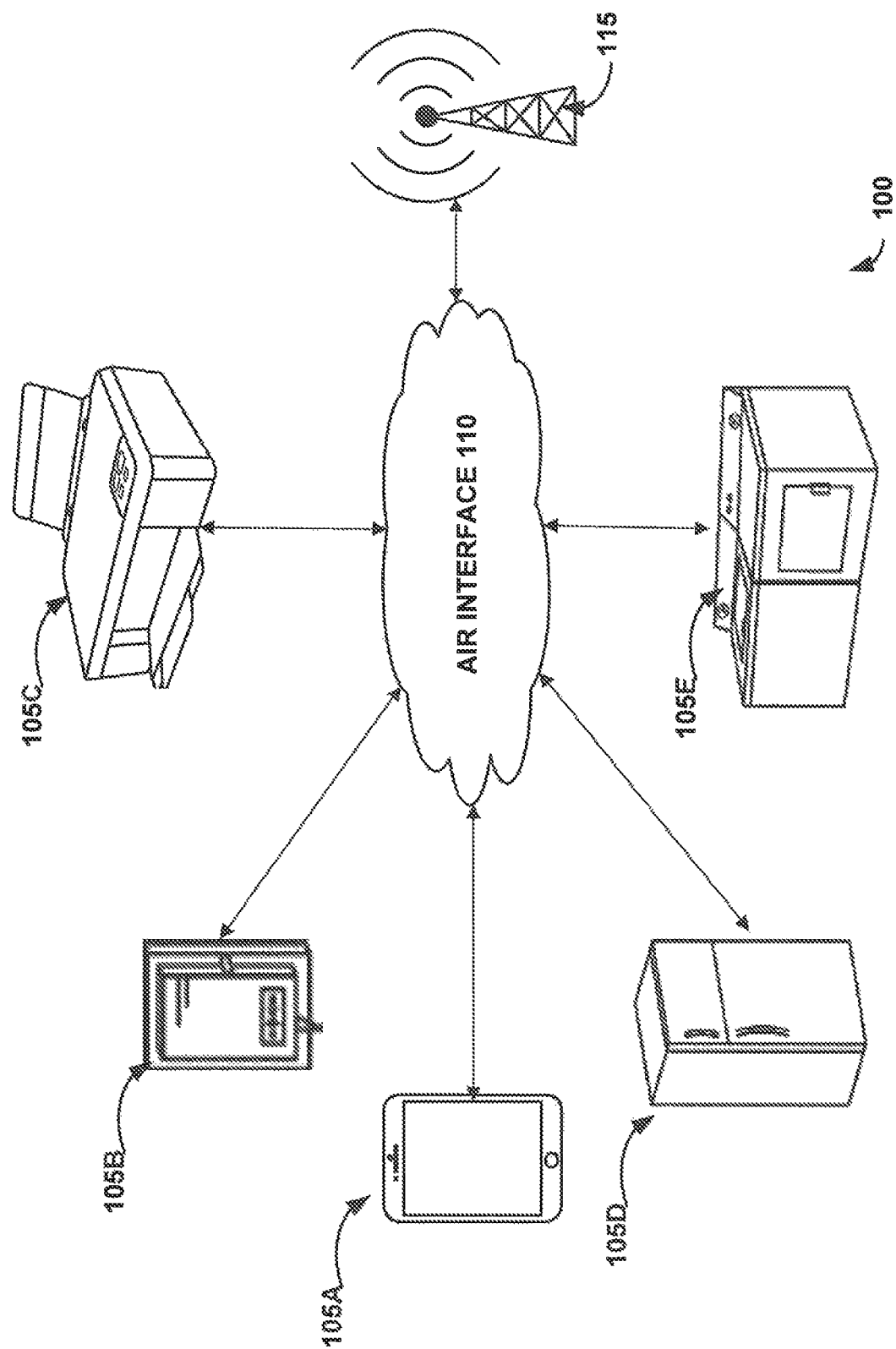
FIG. 1 is exemplary IOT communication network in which various embodiments of the present disclosure may function.

FIG. 1 is an example communication IOT network 100 that may include a plurality of IOT devices 105A-N, such as a smart phone 105A, a smart meter 105B, a printer 105C, a refrigerator 105D, a washing machine 105E, and the like. In the IOT network 100, the connectivity technology for IOT services is classified into two categories according to the coverage distance: Narrow Band Internet of Things (NB-IoT) communication and short-range communication. Used herein, NB-IOT communication may refer to communication between two or more IOT devices 105A-N through an air interface 110 established through a NB-IOT evolved nodeB (NB-IOT eNB) 115. The NB-IOT communication may be defined under the 3GPP to enable IOT connectivity using the licensed frequencies and to co-exist with legacy cellular broadband technologies like Long-Term Evolution (LTE), Universal Mobile Telecommunications System (UMTS), and Global System for Mobile Communications (GSM). Example NB-IOT eNB 115 uses Low-Power Wide Area Network (LPWAN) technology that realizes communication distance up to 40 km, in which the IOT devices 105A-B are supported by one NB-IOT eNB (i.e., one base station).

Example NB-IOT eNB may offer supported Bandwidth Range (SBR) including three deployment scenarios: these are, guard-band frequency, in-band frequency, and standalone frequency. Example standalone deployment mainly utilizes new bandwidth, the guard-band deployment utilizes the bandwidth reserved in the guard band of the existing LTE network, and in-band deployment makes use of the same resource block in the LTE carrier of the existing LTE network. When an IOT communication session is established through any one frequency band (e.g., guard-band frequency), the entire communication session is continued using the same frequency band. However, switching to another frequency band (e.g., in-band frequency) for continuing the same IOT communication session by the IOT devices 105A-N may not be possible even if the uplink/downlink data volume corresponding to the IOT devices 105A-N fluctuates over the time.

Examples of IOT application using NB-IOT may include smart meter 105B (e.g., household electricity meters) in which an NB-IOT communicator can be installed to automate the acquisition of meter reading of each IOT device 105C-E connected to the smart meter 105B. Further, the smart mobile phone 105A connected to the smart meter 105B, allows the user to monitor, control, and measure the consumption of energy usage on each IOT device 105C-E connected thereto.

Other than NB-IOT communication standard, the IOT network 100 may utilize the short-range communication that refers to direct communication between two or more IOT devices 105A-E without going through any base station (i.e., NB-IOT eNB). Such short-range communication relies on technologies such as Bluetooth, Wireless Fidelity (WiFi), and ZigBee, and the resulting IOT network 100 connects the IOT devices 105A-E based on multiple technologies. Such short-range connectivity may support proximity-based peer-to-peer (P2P) communication that support one-to-one connections or simultaneously connections to a group that includes several devices 105A-B directly communicating with one another.

In a heterogeneous environment, different communication technologies (e.g., NB-IOT and Bluetooth) may be utilized for serving IOT applications running on the IOT devices 105A-E. However, for an entire IOT communication session, the IOT devices 105A-E may communicate with each other directly using either the short-range communication or via the NB-IOT communication. Such kind of the IOT devices 105A-B in the heterogeneous environment may pose several challenges and requirements for choosing the best amongst the available communication technologies.

For an example, consider the smart phone 105A (source IOT device) is running an IOT application associated with electricity metering. Typically, the smart phone 105A may be initially connected to the smart electricity meter 105B (target IOT device) using the NB-IOT eNB (i.e., long-range communication). If a user intends to start the Bluetooth communication between the smart phone 105A and the smart electricity meter 105B, then the change in connectivity may be realized by requiring the user to set the smart phone 105A in a discoverable mode to select the smart electricity meter 105B from a list of discoverable devices found within a communication range of the smart phone 105A and then initiate a pairing process with the smart electricity meter 105B. The term "connection" may refer to two devices exchanging appropriate information to begin communication. The term "pairing" may refer to the two devices exchanging a protected security identification number or password.

Therefore, the pairing and connection procedures for those different communication technologies in the IOT devices 105A-E can be difficult/tedious and time consuming. As a result, at the time of switching the IOT devices 105A-B from the NB-IOT communication to the Bluetooth communication, there may be a delay or a short break in the communication between the smart phone 105A and the smart electricity meter 105B.

Various embodiments of the present technique may overcome one or more of the drawbacks of conventional practice by utilizing an IOT communication controller that provide reliable Internet-Of-Thing (IOT) communication across the plurality of IOT devices 105A-E in the IOT network 100. The IOT communication controller may select a communication link for an IOT session between a source IOT device and a target IOT device based on the device information of the source IOT device, the discoverability of the first target IOT device, and the first IOT application activated on the source IOT device. Example communication link may be one of a short-distance communication link and a NB-IOT communication link. Further, the IOT communication unit may dynamically allocate a Physical Resource Block (PRB) for a plurality of packets transmitted using the first communication link based on a buffer occupancy associated with the IOT application running on the source IOT device. The process of discoverability of the first target IOT device, selection of the communication link for the IOT session, and dynamically allocation of the PRB to the communication link are explained in detail in conjunction with FIGS. 2-5.

Figure 2:
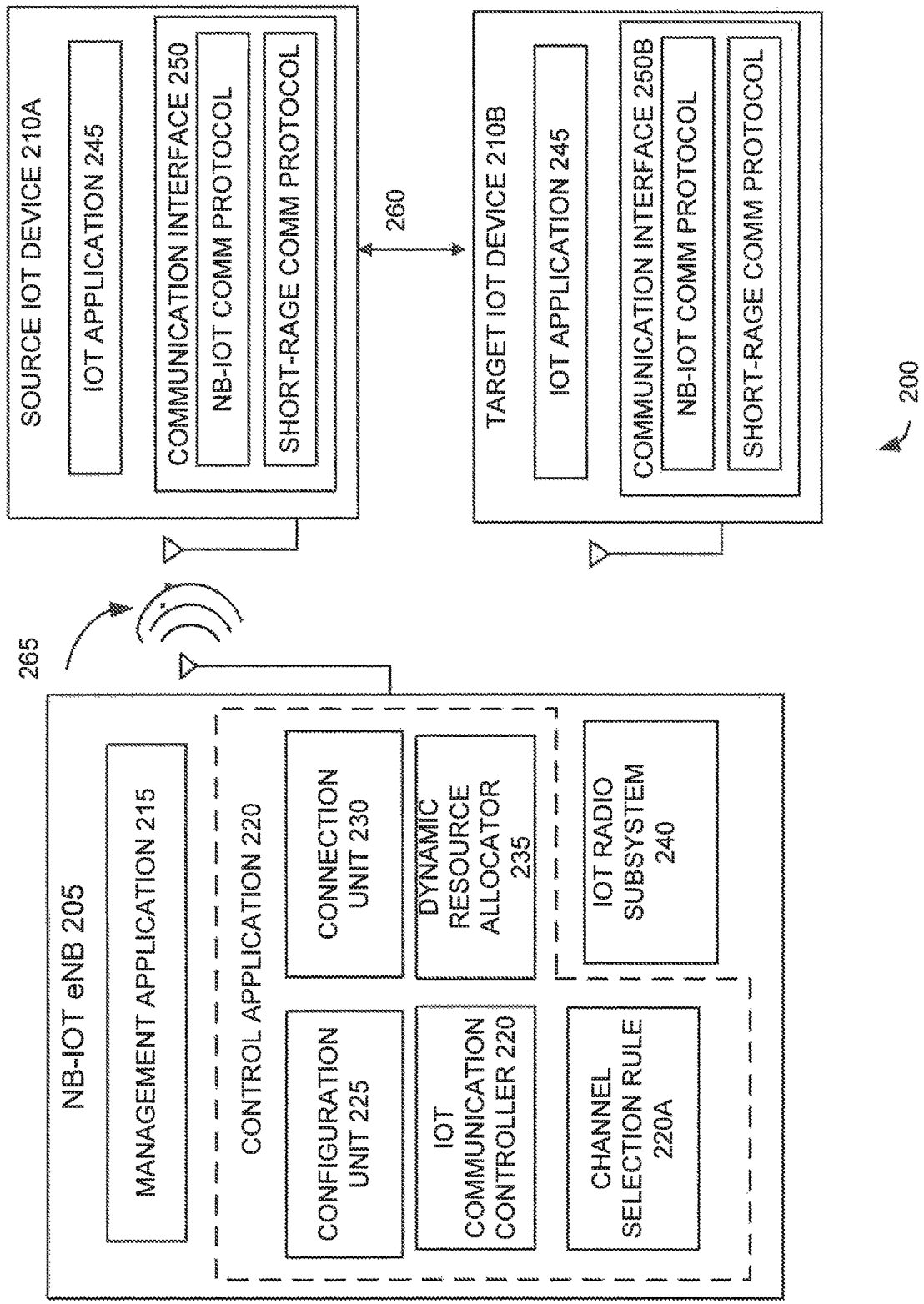
FIG. 2 is a functional block diagram for NB-IOT evolved nodeB (NB-IOT eNB) for controlling IOT communication between IOT devices, according to an exemplary embodiment of the present disclosure.

FIG. 2 shows a more detailed view of NB-IOT eNB 205 to control IOT communication between a source-IOT-device 210A and a target-IOT-device 210B in an illustrative embodiment. The NB-IOT eNB 205 comprises a management application 215 and a control application 220. The control application 220 may include an IOT communication controller 220, a configuration unit 225, a connection mobility unit 230, a dynamic resource allocator 235, and an IOT radio subsystem 240 communicatively coupled to each other. The IOT communication controller 220 may be implemented at least in part in the form of software executed by an IOT processor of the NB-IOT eNB 205. The IOT processor of the NB-IOT eNB 205 may comprise, for example, microprocessors, application-specific integrated circuits (ASICs), digital signal processors (DSPs) or other types of processing devices, as well as portions or combinations of such elements.

In operation, the IOT communication controller 220 may take IOT communication decision and establish Narrow-Band (NB) communication between NB-IOT eNB 205 and IOT devices 210A-B. Example IOT devices 210A-B run IOT application 245 and may possess communication interfaces 250A and 250B, respectively, that operate on NB-IOT communication protocol or short-range communication protocol. The IOT communication controller 220 may obtain IOT communication related configuration information from management application 215. In one example, the IOT communication controller 220 is adapted to obtain the necessary configuration information and loads it as a Local-Copy (LC) into in-built persistent-memory (not shown in FIG. 2). The Local-Configuration (LC) has the following parameters: supported device type (SDT), supported Bandwidth Range (SBR), and threshold device range (DevRange$_{TH}$). Used herein, (i) Supported Device Type (SDT): may include the different types of IOT device supported by the NB-IOT eNB 205, (ii) Supported Bandwidth (SBR): includes the available range of bandwidth for the IOT device supported by the NB-IOT eNB 205, (iii) threshold device range (DevRange$_{TH}$): indicates the maximum distance between IOT devices 210A-B which shall be supported for NB-IOT eNB 205, and (iv) threshold synchronization time (SychTime$_{Th}$): indicates the maximum time delay for establishing communication between IOT device 210A-B and NB-IOT eNB 205.

In operation, the IOT communication controller 220 may identify device information and the configuration information of the source-IOT-device 210A upon synchronization of the source-IOT-device 210A with the current NB-IOT eNB (i.e., base station) 205 in an IOT network. The time synchronization between source-IOT-device 210A and NB-IOT eNB 205 may be established by Timing Advance (TA) procedure.

Once the time synchronization is completed, Random Access Channel (RACH) procedure is used to establish control channel between the source-IOT-device 210A and the current NB-IOT eNB 205. Through the control channel, the device information of the source-IOT-device 210A may be identified by the NB-IOT eNB 205, where the device information (i.e., DEVICE$_{NB-RANGE}$ or DEVICE$_{SHORT-RANGE}$) may include one or more IOT applications 245 tagged with the source-IOT-device 210A, one or more communication mechanisms 250 that operate on different communication protocols for supporting the one or more IOT applications 245, and device type of the source-IOT-device 210A. Used herein, device type may include active IOT device that supports both NB communication and short-range communication, and passive IOT device that supports either NB communication or short-range communication. In one example, the IOT communication controller 220 may identify the device information by categorizing the IOT application 245 running on the source IOT device 210A based on service supported by at least one of NB-IOT communication 255A and short range communication 255B. In addition, the IOT communication controller 220 may identify configuration information of the source-IOT-device 210A from the Local Copy (LC).

Further, the IOT communication controller 220 may determine that a first target-IOT-device 210B is discoverable in the current NB-IOT eNB 205 for establishing a first IOT session from the source-IOT-device 210A to the target-IOT-device 210B, upon activating a first IOT application 245 of the source-IOT-device 245. Furthermore, the IOT communication controller 220 may select a first communication link for the first IOT session based on a channel selection rule 220A. Example channel selection rule 220A may define a mapping between the device information of the source-IOT-device 210A, the discoverability of the first target-IOT-device 210B, and the first IOT application 245 activated on the source-IOT-device 210A. Example first communication link is one of: (i) direct short-distance communication link between the source-IOT-device 210A and the target-IOT-device 210B or (ii) NB-IOT communication link between the source-IOT-device 210A and the target-IOT-device 210B via the NB-IOT eNB 205.

Used herein, the determination of discoverability of the first target-IOT-device 210B may include determining whether the first target-IOT-device 210b is discoverable to the source-IOT-device 210A using a device discovery scheme associated with short-distance communication link. In one example, device discovery scheme (DS$_{short-distance}$) associated with short-distance communication link may be initiated in the source IOT device 210A and target IOT device 210B, based on a control-packet received at a predefined time interval from the NB-IOT eNB 205 during the Random Access Channel (RACH) procedure. Example control-packet are generated at the NB-IOT eNB 205 based on the device information of the source-IOT-device 210A, for enabling automatic pairing and connecting processes of the source-IOT-device 210A with the target-IOT-device 201B.

If the source IOT device 210A and target IOT device 210B are discoverable using the device discovery scheme associated with short-distance communication link, the IOT communication controller 220 may select the short-distance communication link 260 for direct peer-to-peer communication between the source-IOT-device 210A and the first target-IOT-device 210B. Else, the IOT communication controller 220 may select the NB-IOT communication link 265 for indirect peer-to-peer communication between the source-IOT-device 210A and the first target-IOT-device 210B through the current NB-IOT eNB 205.

Upon establishing the short-distance communication link 260 or NB-IOT communication link 265, the IOT communication controller 220 may dynamically allocate a Physical Resource Block (PRB) for a plurality of packets transmitted using the first communication link (i.e., 260 or 265) based on a buffer occupancy associated with uplink and/or downlink data volume to-be-channeled through the first communication link (i.e., 260 or 265).

In one example, the IOT communication controller 220 may dynamically allocate the PRB by allocating at least one subcarrier block to communicate the uplink/downlink data packets associated with the first IOT application 245 of the source-IOT-device 210A based on the buffer occupancy of the uplink/downlink data packets. Further, based on data throughput and bandwidth requirement of the source-IOT-device 210A, a number of the at least one subcarrier block may be dynamically changed to communicate the uplink/downlink data packets associated with the first IOT application 210A.

In one example, upon detecting a data throughput drop and/or a failure in the first communication link based on a Received Signal Strength Indicator (RSSI) value of the first communication link, the IOT communication controller 220 may select a second communication link for resuming the first IOT session from the source-IOT-device to the first target-IOT-device. In one example, data throughput drop is determined based on deviation (DataRate$_{Dev}$) in an estimated data rate (DataRate$_{EST}$) and actual data rate (DataRate$_{ACT}$). The estimated data rate (DataRate$_{EST}$) is determined as follow:

DataRate$_{EST}$=F$_n$(allocated resource, SINR, comm. type)

Where, F$_n$ is the frequency band used for the communication channel between the the source IOT device and the target IOT device;

SINR is the signal interference to noise ratio;

Comm. type is either NB-IOT/short-range communication

The actual data rate is received as a device feedback (DataRate$_{ACT}$) from the source IOT device 210B. Then, the deviation is determined as follow:

DataRate$_{Dev}$=DataRate$_{EST}$−DataRate$_{Act}$.

If the deviation is more than a threshold deviation (i.e., DataRateDev>DataRateThDev), then the PRB allocation is recalculated and re-assigned to the source IOT device 210A. Elseif the deviation is less than a threshold deviation (i.e., DataRateDev<DataRateThDev), the allocated PRBs to the source IOT device 210A may be reused to remaining IOT device other than the source IOT device 210A. Hence, in this way, the IOT communication controller 220 may correct the resource by proper allocation of radio resources, taking into account the threshold data rate transferred from the source- IOT-device 210A and received in the other end of the target-IOT device 210B. In one example, when the data throughput drop is in the first communication link (a first NB-IOT$_{comm-link}$), the IOT communication controller 220 may select a second communication link (a second NB-IOT$_{comm-link}$) for resuming the first IOT session from the source-IOT-device 210A to the first target-IOT-device 210B. In such case, the second communication link operate on a communication protocol identical to the first communication link.

On the other hand, upon detecting a failure in the first communication link (e.g., NB-IOT$_{comm-link}$), the IOT communication controller 220 may select a second communication link (e.g., Bluetooth$_{comm-link}$) for resuming the first IOT session from the source-IOT-device 210A to the first target-IOT-device 210B. In this case, the second communication link (e.g., Bluetooth$_{comm-link}$) operate on a communication protocol different from the first communication link (e.g., NB-IOT$_{comm-link}$).

In another example, upon activating a second IOT application, the IOT communication module may select a second communication link between the source-IOT-device (e.g., smart phone) and a second target-IOT-device, while the source-IOT-device and the first target-IOT-device communicate through the first communication link.

In particular, as will be appreciated by those of ordinary skill in the art, the management application 215, components of the control application 220, IOT communication controller 220 for performing the techniques and steps described herein may be implemented by the NB-IOT eNB, either by hardware, software, or combinations of hardware and software. For example, suitable code may be accessed and executed by the one or more processors on the NB-IOT eNB to perform some or all of the techniques described herein. Similarly, application specific integrated circuits (ASICs) configured to perform some or all of the processes described herein may be included in the one or more processors on the NB-IOT eNB.

Figure 3A:
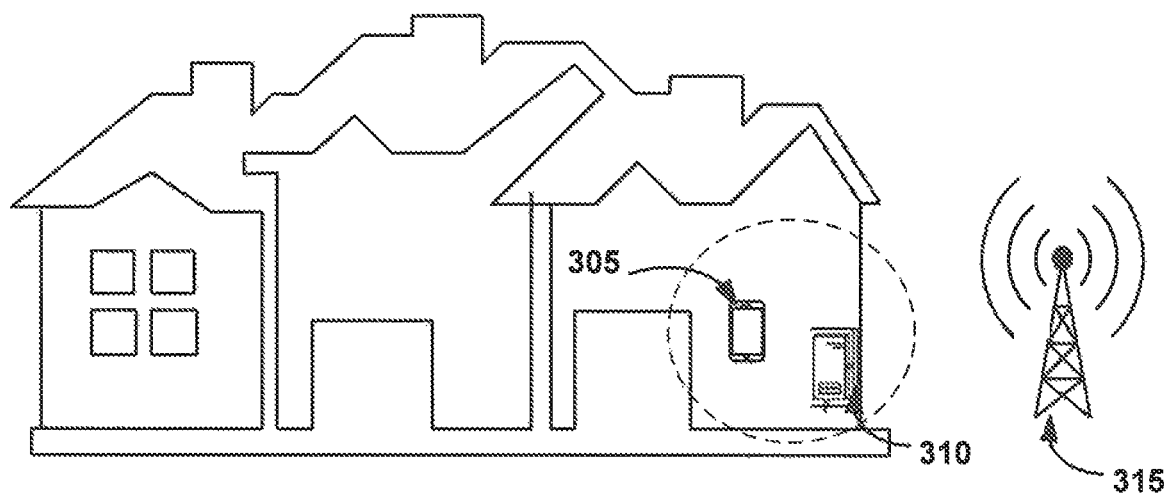
FIG. 3A-3D illustrates a system for NB-IOT eNB for controlling IOT communication between smart phone and smart meter, according to an exemplary embodiment of the present disclosure.
Figure 3B:
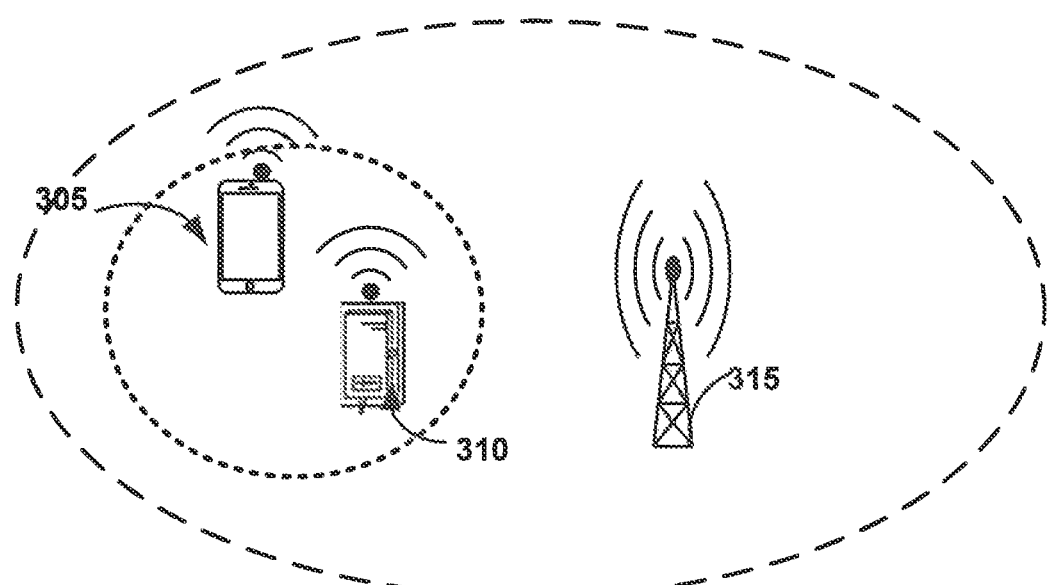

FIGS. 3A-B illustrates a system 300 for controlling IOT communication between IOT devices 305 and 310. As shown, two IOT devices, i.e., smart phone 305 and smart meter 310 located remotely may include Bluetooth communication capability and NB-IOT communication capability to communicate with each other through an IOT network, Consider a user of smart phone 305 selects a smart meter application to monitor, control, and measure the electric consumption of each appliance connected thereto. In this case, IOT communication between smart phone 305 and smart meter 310 may be performed by the following operations: the device information of the smart phone 305 may be obtained at the NB-IOT eNB 315.

Figure 3C:
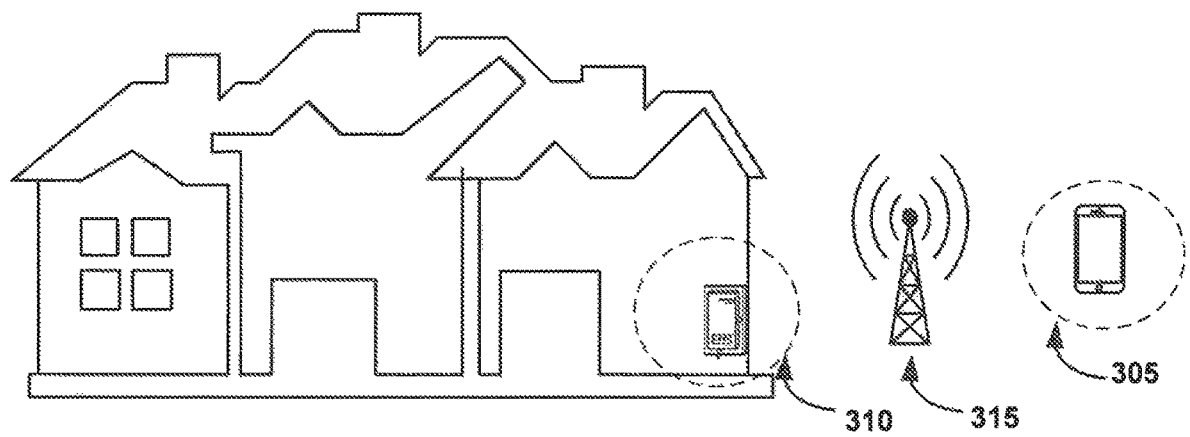
Figure 3D:
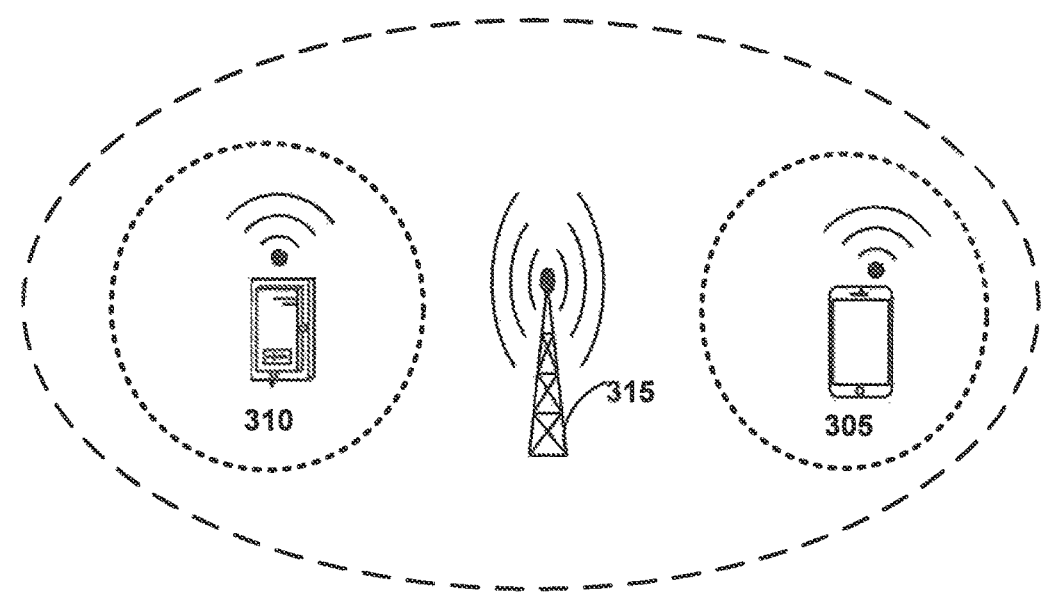

A check is made to determine whether the smart meter 310 is discoverable to the source-IOT-device 305 using a device discovery scheme associated with Bluetooth link, based on a control packet received at a predefined time interval from the NB-IOT eNB 315 during the RACH procedure. If yes, the Bluetooth link may be selected for direct peer-to-peer communication between the smart phone 305 and the smart meter 310 based on the channel selection rule (i.e., mapping between the device information of the smart phone 305, the discoverability of the smart meter 310, and the IOT application activated on the smart phone 305). Further, the Physical Resource Block (PRB) for a plurality of packets transmitted using the Bluetooth link may be dynamically allocated based on a buffer occupancy associated with the first IOT application of the smart phone 305. As shown in FIGS. 3C-D, when the smart phone 305 is out-of-reach corresponding to the smart meter 310, the NB-IOT eNB 315 may detect the throughput drop and/or a failure in the Bluetooth link based on a Received Signal Strength Indicator (RSSI) value of the Bluetooth link from the source-IOT-device 305 to the target-IOT-device 310. Upon detecting the throughput drop and/or a failure in the Bluetooth link, NB-IOT eNB 315 select a NB communication link for resuming the first IOT session from the smart phone 305 to the smart meter 310. In this example, while establishing each communication link (i.e., Bluetooth or NB), the PRB allocation of the communication link may be recalculated and re-assigned to the smart phone 305 based on the (i) buffer occupancy associated with the uplink and/or downlink data volume to-be-channeled corresponding to the smart phone 305 and (ii) data throughput and bandwidth requirement of the smart phone 305.

Figure 4:
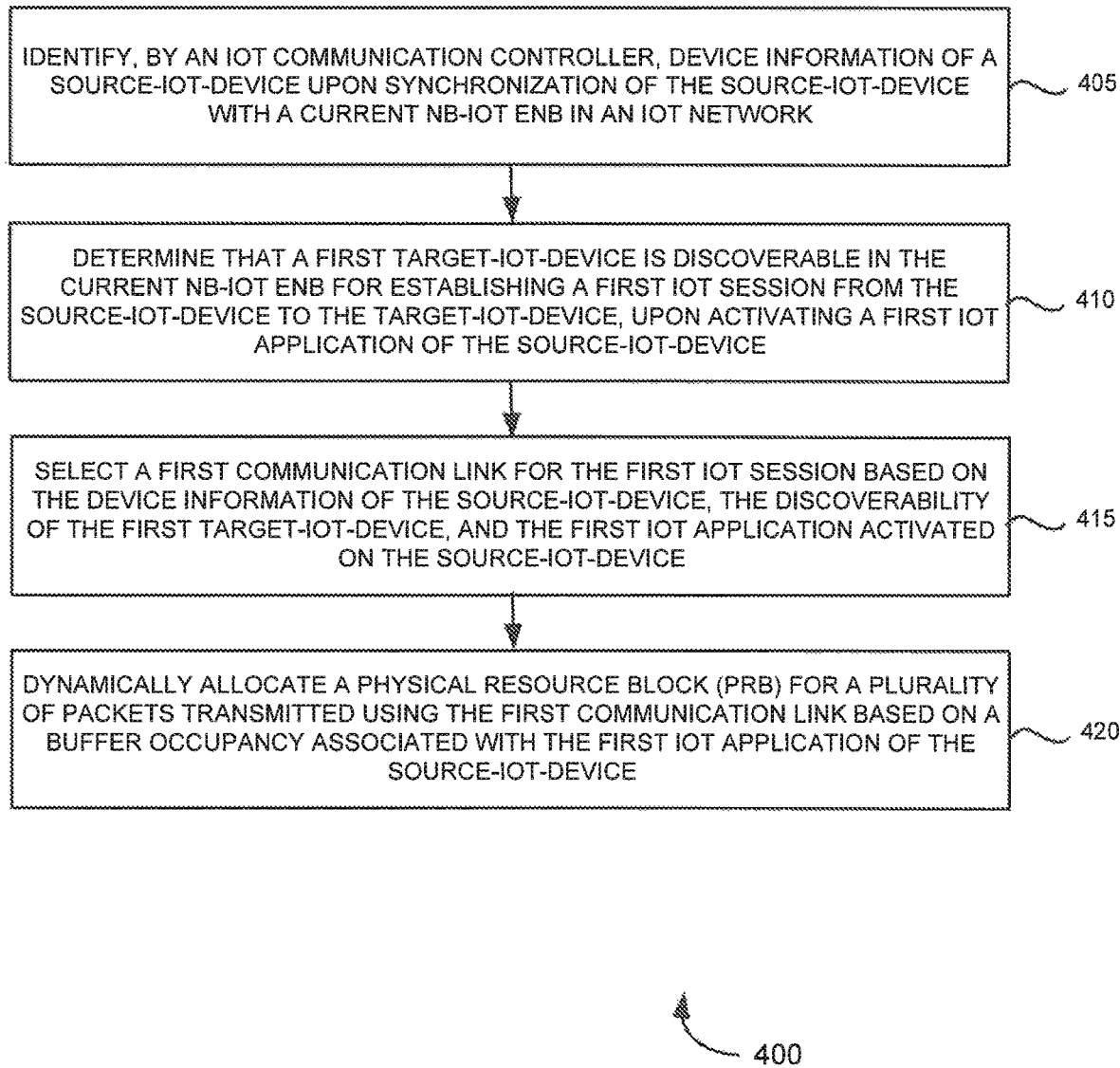
FIG. 4 is a flow diagram illustrating steps performed at a NB-IOT eNB for controlling IOT communication between smart phone and smart meter, in accordance with an exemplary embodiment of the present disclosure.

FIG. 4 shows a method 400 of reliable Internet-Of-Thing (IOT) communication across a plurality of IOT devices in an illustrative embodiment. At 405, device information of a source-COT-device may be identified by an IOT communication controller of a NB-IOT eNB, upon synchronization of the source-IOT-device with a current NB-IOT eNB in an IOT network. Example device information of the source-IOT-device may include one or more IOT applications tagged with the source-IOT-device, one or more communication mechanisms that operate on different communication protocols for supporting the one or more IOT applications, and device type of the source-IOT-device.

At 410, a check is made to determine that a first target-IOT-device is discoverable in the current NB-COT eNB for establishing a first IOT session from the source-IOT-device to the target-IOT-device, upon activating a first IOT application of the source-IOT-device. At 415, a short-distance communication link or a NB-IOT communication link for the first IOT session may be selected based on the device information of the source-IOT-device, the discoverability of the first target-IOT-device, and the first IOT application activated on the source-IOT-device. wherein the first communication link is one of. At 420, a Physical Resource Block (PRB) for a plurality of packets transmitted using the first communication link may be dynamically allocated based on a buffer occupancy associated with the first IOT application of the source-IOT-device.

Computer System

Figure 5:
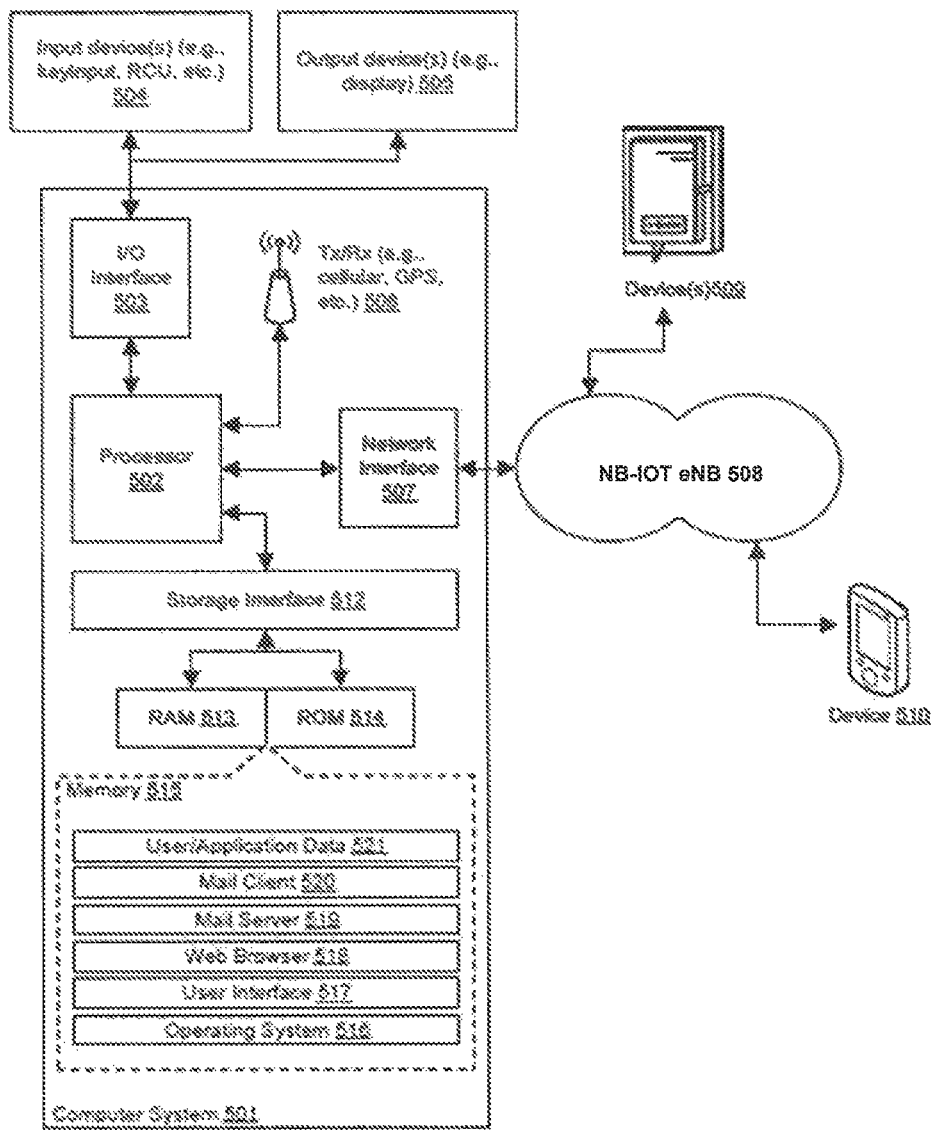
FIG. 5 is a block diagram of an exemplary computer system for implementing embodiments consistent with the present disclosure.

FIG. 5 is a block diagram of an exemplary computer system for implementing embodiments consistent with the present disclosure. Variations of computer system 501 may be a NB-IOT eNB. Computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control unit 104s, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be (infrared) remote control, key-inputs, keyboard, microphone, touch screen, touchpad, sensor (e.g., accelerometer, light sensor, GPS, gyroscope, proximity sensor, or the like), visors, etc. Output device 505 may be a video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, GSM network and other similar network that provide voice communication such as a direct interconnection, local area network (LAN), wide area network (WAN), wireless network (e.g., using Wireless Application Protocol), the Internet, etc. Using the network interface 507 and the NB-IOT communication network 508, the computer system 501 may communicate with IOT devices (i.e., smart meter 509 and smart phone 510). These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 configuration information and other device information associated with the connected IOT devices as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described method and system for controlling communication between internet-of-thing (IOT) devices. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of reliable Internet-Of-Thing (IOT) communication across a plurality of IOT devices, the method comprising:
identifying, by an IOT communication controller, device information of a source-IOT-device upon synchronization of the source-IOT-device with a current Narrow Band IOT evolved nodeB (NB-IOT eNB) in an IOT network;
determining, by the IOT communication controller, that a first target-IOT-device is discoverable in the current NB-IOT eNB for establishing a first IOT session from the source-IOT-device to the first target-IOT-device, upon activating a first IOT application of the source-IOT-device, wherein determining that the first target-IOT-device is discoverable in the current NB-IOT eNB, comprises:
determining whether the first target-IOT-device is discoverable to the source-IOT-device using a device discovery scheme associated with short-distance communication link:
if yes, selecting the short-distance communication link for direct peer-to-peer communication between the source-IOT-device and the first target-IOT-device; and
if no, selecting a NB-IOT communication link for indirect peer-to-peer communication between the source-IOT-device and the first target-IOT-device through the current NB-IOT eNB;
selecting, by the IOT communication controller, a first communication link for the first IOT session based on the device information of the source-IOT-device, the discoverability of the first target-IOT-device, and the first IOT application activated on the source-IOT-device, wherein the first communication link is one of a short-distance communication link and the NB-IOT communication link; and
dynamically, by the IOT communication controller, allocating a Physical Resource Block (PRB) for a plurality of packets transmitted using the first communication link based on a buffer occupancy associated with the first IOT application of the source-IOT-device.

2. The method of claim 1, further comprising selecting a second communication link between the source-IOT-device and a second target-IOT-device upon activating a second IOT application, wherein the second communication link and the first communication link simultaneously operate on different communication protocols.

3. The method of claim 1, further comprising:
selecting a second communication link for resuming the first IOT session from the source-IOT-device to the first target-IOT-device, upon detecting a data throughput drop and/or a failure in the first communication link, wherein the second communication link operates on a communication protocol different from the first communication protocol.

4. The method of claim 1, wherein the device information of the source-IOT-device comprises: one or more IOT applications tagged with the source-IOT-device, one or more communication mechanisms that operate on different communication protocols for supporting the one or more IOT applications, and device type of the source-IOT-device.

5. The method of claim 1, wherein determining the buffer occupancy associated with the first IOT application, indicates uplink and/or downlink data volume to-be-channeled through the first communication interface.

6. The method of claim 5, wherein dynamically allocating the PRB for the uplink and/or downlink data volume to-be-channeled through the first communication interface, comprises:
allocating at least one subcarrier block to communicate the uplink and/or downlink data associated with the first IOT application of the source-IOT-device based on the buffer occupancy of the uplink and/or downlink data; and
dynamically changing a number of the at least one subcarrier block to communicate the uplink and/or downlink data associated with the first IOT application based on data throughput and bandwidth requirement of the source-IOT-device.

7. A Narrow Band-Internet Of Thing evolved nodeB (NB-IOT eNB) for reliable IOT communication across a plurality of IOT devices, the NB-IOT eNB comprising:
a processor; and
a memory for storing an IOT communication controller module that is executed by the processor to:
identify device information of a source-IOT-device upon synchronization of the source-IOT-device with a current NB-IOT eNB in an IOT network;
determine that a first target-IOT-device is discoverable in the current BS for establishing a first IOT session from the source-IOT-device to the first target-IOT-device, upon activating a first IOT application of the source- IOT-device, wherein determining that the first target-IOT-device is discoverable in the current BS, comprises:
  determining whether the first target-IOT-device is discoverable to the source-IOT-device using a device discovery scheme associated with short-distance communication link:
    if yes, selecting the short-distance communication link for direct peer-to-peer communication between the source-IOT-device and the first target-IOT-device; and
    if no, selecting the NB-IOT communication link for indirect peer-to-peer communication between the source-IOT-device and the first target-IOT-device through the current NB-IOT eNB;
  select a first communication link for the first IOT session based on the device information of the source-IOT-device, the discoverability of the first target-IOT-device, and the first IOT application activated on the source-IOT-device, wherein the first communication link is one of a short-distance communication link and a NB-IOT communication link; and
  dynamically allocate a Physical Resource Block (PRB) for a plurality of packets transmitted using the first communication link based on a buffer occupancy associated with the first IOT application of the source-IOT-device.

8. The NB-IOT eNB of claim 7, wherein the IOT communication controller module selects a second communication link between the source-IOT-device and a second target-IOT-device upon activating a second IOT application, wherein the second communication link and the first communication link simultaneously operate on different communication protocols.

9. The NB-IOT eNB of claim 7, wherein the IOT communication controller module selects a second communication link for resuming the first IOT session from the source-IOT-device to the first target-IOT-device, upon detecting a data throughput drop and/or a failure in the first communication link, wherein the second communication link operate on a communication protocol different from the first communication protocol.

10. The NB-IOT eNB of claim 7, wherein the device information of the source-IOT-device comprises: one or more IOT applications tagged with the source-IOT-device, one or more communication mechanisms that operate on different communication protocols for supporting the one or more IOT applications, and device type of the source-IOT-device.

11. The NB-IOT eNB of claim 7, wherein the buffer occupancy associated with the first IOT application, indicates uplink and/or downlink data volume to-be-channeled through the first communication interface.

12. The NB-IOT eNB of claim 11, wherein dynamically allocating the PRB based on buffer occupancy of the uplink and/or downlink data volume associated with the first IOT application, comprises:
  allocating at least one subcarrier block to communicate the uplink/downlink data packets associated with the first IOT application of the source-IOT-device based on the buffer occupancy of the uplink/downlink data packets; and
  dynamically changing a number of the at least one subcarrier block to communicate the uplink/downlink data packets associated with the first IOT application based on data throughput and bandwidth requirement of the source-IOT-device.

13. A non-transitory computer-readable storage medium having stored thereon, a set of computer-executable instructions causing a (NB-IOT eNB) comprising one or more processors to:
  identify device information of a source-IOT-device upon synchronization of the source-IOT-device with a current NB-IOT eNB in an IOT network;
  determine that a first target-IOT-device is discoverable in the current NB-IOT eNB for establishing a first IOT session from the source-IOT-device to the first target-IOT-device, upon activating a first IOT application of the source-IOT-device, wherein determining that the first target-IOT-device is discoverable in the current NB-IOT eNB, comprises:
    determining whether the first target-IOT-device is discoverable to the source-IOT-device using a device discovery scheme associated with short-distance communication link:
      if yes, selecting the short-distance communication link for direct peer-to-peer communication between the source-IOT-device and the first target-IOT-device; and
      if no, selecting a NB-IOT communication link for indirect peer-to-peer communication between the source-IOT-device and the first target-IOT-device through the current NB-IOT eNB;
  select a first communication link for the first IOT session based on the device information of the source-IOT-device, the discoverability of the first target-IOT-device, and the first IOT application activated on the source-IOT-device, wherein the first communication link is one of a short-distance communication link and a NB-IOT communication link; and
  dynamically allocate a Physical Resource Block (PRB) for a plurality of packets transmitted using the first communication link based on a buffer occupancy associated with the first IOT application of the source-IOT-device.

* * * * *